United States Patent [19]

Diederichs et al.

[11] Patent Number: 5,480,195
[45] Date of Patent: Jan. 2, 1996

[54] HIGH-PRESSURE PIPELINE

[75] Inventors: Ryszard Diederichs, Katowice; Helmut Sznapka, Pilchowice; Józef Bubniak, k/Jalła, all of Poland

[73] Assignee: Centrum Merchanizacji Gornictwa "Komag", Gliwice, Poland

[21] Appl. No.: 259,501

[22] Filed: Jun. 14, 1994

[30] Foreign Application Priority Data

Jun. 14, 1993 [PL] Poland ................................. 299333

[51] Int. Cl.$^6$ ................................................. F16L 27/00
[52] U.S. Cl. ........................... 285/184; 285/286; 285/354
[58] Field of Search ............................ 285/184, 286, 285/354, 342

[56] References Cited

U.S. PATENT DOCUMENTS 1,880,098  9/1932  Mair ........................................ 285/184
2,581,047  1/1952  Salmond et al. ..................... 265/184 X
4,813,713  3/1989  Peaster ................................ 285/184 X

FOREIGN PATENT DOCUMENTS 559966   9/1923   France ................................. 285/184
805469   5/1951   Germany ............................. 285/184
2500297  12/1975  Germany ............................. 285/184

*Primary Examiner*—Dave W. Arola
*Attorney, Agent, or Firm*—Ladas & Parry

[57] ABSTRACT

Basic segment of a high-pressure pipeline has elements (1) and (2) connected to one another with an oblique rotary connection inclined at angle (alpha) to the pipeline axis (7), wherein the turning angle (8) of said oblique connection intersects in piping axis (7) the plane of revolution being perpendicular to the turning axis (8).

12 Claims, 2 Drawing Sheets

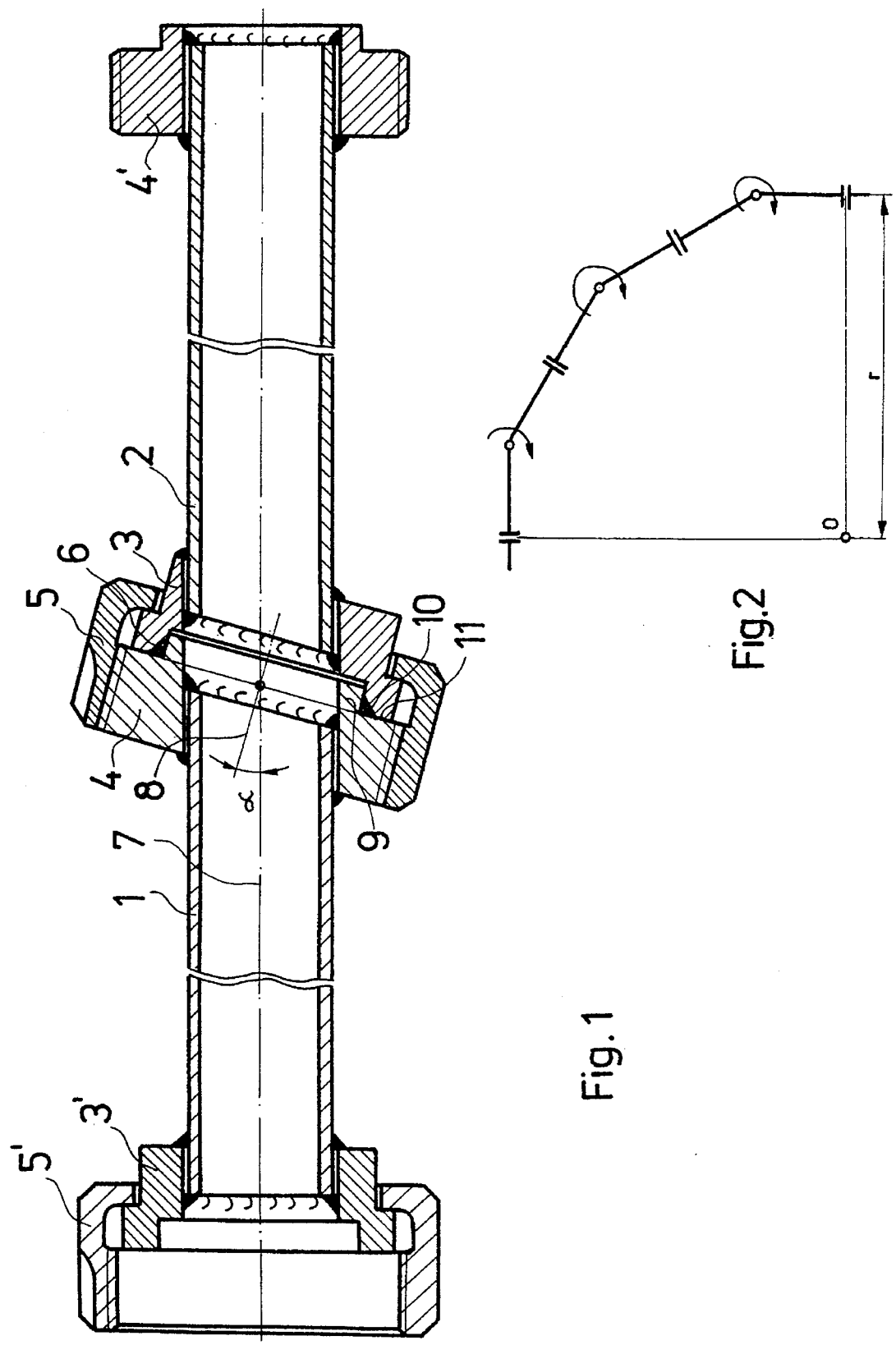

HIGH-PRESSURE PIPELINE

FIELD OF THE INVENTION

The subject of this invention is a high-pressure pipeline, particularly a segmental one for supplying working medium to combined cutters-loaders.

BACKGROUND OF THE INVENTION

In underground mining excavations a water emulsion having a pressure on an order of 36 MPa is used for supplying combined cutters-loaders. Central supply stations are located in the vicinity of the shaft at a considerable distance from the coal working area and they supply the working medium simultaneously to several working places. But great distances lead to considerable losses and pressure drops for working medium supplied with hoses. For this reason pipes for supply of combined cutters-loaders must be used.

The utility model Ru 36 249 shows a high-pressure pipeline consisting of articulated segments. At the end of each segment there is, on one side, a ball end-piece with a through duct and a nut with rear thrust flange. On the opposite end, there is an externally threaded flange, which on the side of connected adjacent segment, has a seat accommodating a seal in contact with the spherical surface of the adjacent segment.

High-pressure pipeline according to this system has many drawbacks and inconveniences. In the case of an angular location of the connected segments and particularly in the area of curvatures and arcs, the cross section area of the pipeline is considerably reduced and in consequence, the resistance of flow of the working medium which is supplied to the combined cutters-loaders is considerably increased.

SUMMARY OF INVENTION

The object of the invention is a high-pressure pipeline of a design that would be suitable independent of the lay of the land and the mining and geological conditions of the mine.

This object has been achieved by a high-pressure pipeline and particularly a segmental one for supplying the working medium to the combined cutters-loaders, consisting of basic segments connected to one another by means of flanges and nuts into a main line of the desired length which, according to the invention, has oblique internal end-pieces of the individual elements of the basic segment and which are connected to one another by means of an oblique rotary connection inclined at an angle 'alpha' to the axis of the pipeline, wherein the turning axis of the oblique connection intersects the pipeline axis with the plane of revolution perpendicular to the turning axis.

Connection of two subsequent basic segments in the case of twisting at a definite angle gives after revolution into extreme location doubled angle. In consequence, pipeline can run in mine roads with arbitrary arcs and curvatures both in the horizontal, as well as vertical plane in arbitrary geological conditions of the mine.

BRIEF DESCRIPTION OF THE DRAWING

The object of the invention will now be explained in detail with respect to a preferred embodiment shown in the drawing, wherein FIG. 1 presents an axial section of the basic segment of the pipeline.

FIG. 2 is a diagram of an arced pipeline (with 90 degrees turning angle); and

DETAILED DESCRIPTION

Figure 3:
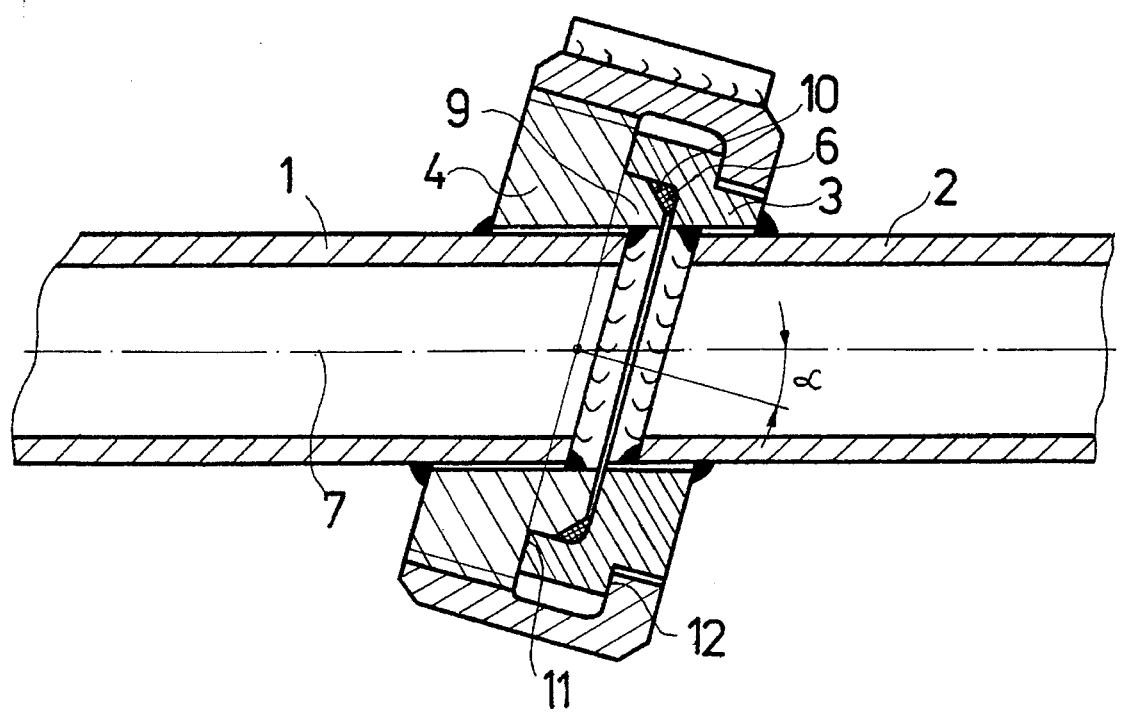
FIG. 3 shows an axial section of an oblique connection of the individual elements of the pipeline.

High pressure pipeline according to the invention consists of a number of basic segments connected with one another into a main line of desired length.

Each basic segment consists of elements 1 and 2, whose external ends are perpendicular to the pipeline axis 7 and are connected with one another with an oblique rotary connection inclined at angle 'alpha' to axis 7. Inclination angle 'alpha' is 45 degrees, whereas turning axis 8 intersects in pipeline axis 7 the plane of revolution 11 of the articulated connection. The connection of oblique elements 1 and 2 of a segment after revolution around turning axis 8 in the plane of revolution of the oblique connection to the extreme position gives a doubled basic turning angle. Accordingly to that, as can be seen in FIG. 2, the pipeline can be turned at an angle of 90 degrees in an arbitrary plane this being affected by means of several basic segments of the respective length with the given inclination angle 'alpha' of the turning axis.

Oblique rotary connection of basic segments consists of a flange 4 situated at the end of the oblique element 1 of segment and flange 3 with nut 5 on the adjacent oblique end of element 2 of the basic segment. Flange 4 has a protrusion for a perfect sealing of the seal 6 to the truncation of protrusion 10 of the flange 3. In another example of embodiment (FIG. 3), the flange 4 has a protrusion 9 for a perfect sealing of the seal 6 to the seat of the flange 3, wherein the protrusion 9 has a truncation 10 on the circumference.

External elements 1 and 2 of the pipeline perpendicular to the pipeline axis 5 are terminated with a flange 4' and flange 3' with nut 5' which, depending on the existing needs, can be connected with straight segments or the next basic segments. Pipeline of an arbitrary length and shape for supplying the working medium to the combined cutters-loaders can be obtained depending upon the length of those segments and their number.

We claim:

1. A pipeline for feeding medium under pressure from a first area to a second area, said pipeline comprising: a) a plurality of pipe segments including a first straight pipe segment of substantially circular cross-section and a second straight pipe segment of substantially circular cross-section, each of said first and second pipe segments having an oblique internal end and an external end, said first and second pipe segments being connectable with the respective oblique internal ends of said first and second pipe segments in near abutting relation wherein said respective oblique internal ends are rotatable in a rotation plane about a rotating axis which is perpendicular to the rotation plane and which intersects a longitudinal axis of at least the first pipe segment at an oblique angle α, the oblique internal end of the first pipe segment being rotatable in said rotation plane about said rotating axis and being complementary to the oblique internal end of the second pipe segment such that the first and second pipe segments can be positioned in rear abutting relation with respect to one another in any of a plurality of positions with the first and second pipe segments being thereby rotatable between a first configuration with the first and second pipe segments in substantial alignment and a second configuration with the first and second pipe segments disposed at an angle with respect to one another; and b) flange means on said first and second pipe segments for sealably connecting said first and second pipe segments with their respective internal ends in near abutting relation in any of said plurality of positions.

2. A pipeline according to claim 1, wherein said flange means comprises a first internal flange, a second internal flange and a nut, each of said first and second internal flanges and said nut having an axis which forms said angle α with the longitudinal axis when the first and second pipe segments are connected in said first configuration, said first internal flange having a cylindrical recess and said second internal flange having a cylindrical projection which fits inside said cylindrical recess, said nut securing said first internal flange to said second internal flange along said rotation plane with the cylindrical projection fitted inside the cylindrical recess.

3. A pipeline according to claim 2 wherein the external ends of said first and second pipe segments are each perpendicular to said longitudinal axis with the first and second pipe segments in said first configuration.

4. A pipeline according to claim 2 wherein the internal ends of the first and second pipe segments are of substantially the same diameter.

5. A pipeline according to claim 4 wherein the first and second pipe segments are of substantially uniform diameter.

6. A pipeline according to claim 2, wherein at least a portion of the first and second internal flanges abut in said rotation plane with the nut securing the first internal flange to the second internal flange.

7. A pipeline according to claim 6 wherein the cylindrical recess is truncated along a circumference thereof such that the first and second internal flanges define a space for insertion of a seal for said sealably connecting said first and second pipe segments with the cylindrical projection fitted inside the cylindrical recess.

8. A pipeline according to claim 6 wherein the cylindrical projection is truncated along a circumference thereof such that the first and second internal flanges define a space for insertion of a seal for said sealably connecting said first and second pipe segments with the cylindrical projection fitted inside the cylindrical recess.

9. A pipeline according to claim 7 wherein the pipeline comprises a seal for said sealably connecting said first and second pipe segments inserted into said space.

10. A pipeline according to claim 8 wherein the pipeline comprises a seal for said sealably connecting said first and second pipe segments inserted into said space.

11. A pipeline according to claim 1 wherein the angle α is up to 45°.

12. A pipeline according to claim 1 wherein the angle α is 45°.

* * * * *